(No Model.)
J. H. HULINGS.
ANIMAL TRAP.
No. 539,900.  Patented May 28, 1895.
Fig I.
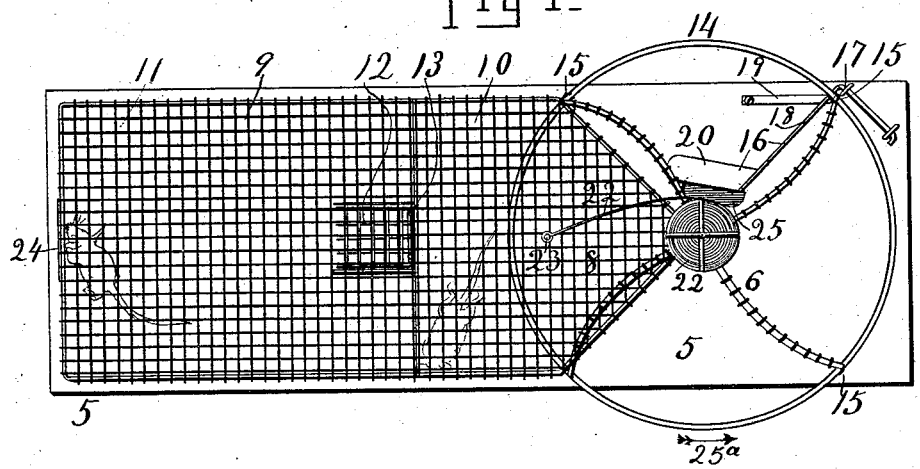
Fig II.
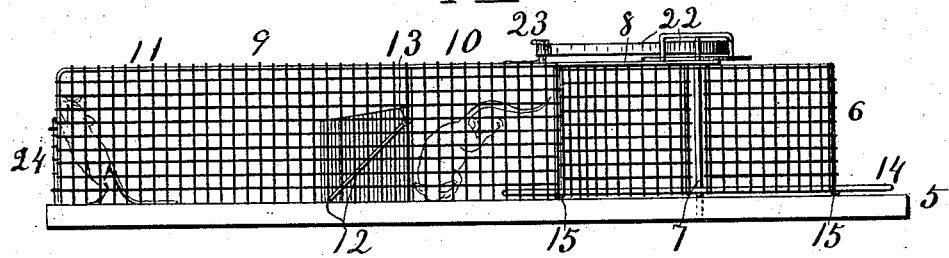
Fig III.
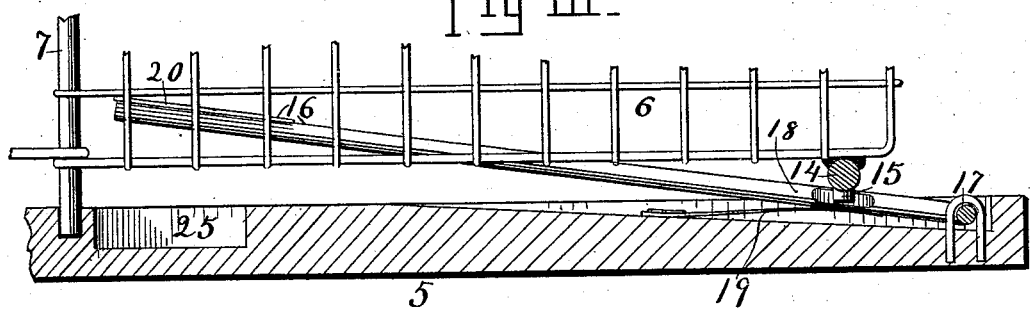
WITNESSES,
P. E. Stevens.
G. M. Copenhaver.
INVENTOR.
James H. Hulings.
by W. X. Stevens. Atty.

UNITED STATES PATENT OFFICE.

JAMES H. HULINGS, OF PARSONS, WEST VIRGINIA.

ANIMAL-TRAP.

SPECIFICATION forming part of Letters Patent No. 539,900, dated May 28, 1895.

Application filed February 13, 1895. Serial No. 538,214. (No model.)

*To all whom it may concern:*

Be it known that I, JAMES H. HULINGS, a citizen of the United States, residing at Parsons, in the county of Tucker and State of West Virginia, have invented a new and useful Improvement in Animal-Traps; and I do hereby declare the following to be a full, clear, and exact description of the same, reference being had to the accompanying drawings, in which—

Figure I is a view looking down upon the top of an animal-trap according to my invention. Fig. II represents the same in side elevation, and Fig. III shows certain details on a larger scale.

This invention relates to that class of animal traps which are adapted to reset themselves after catching an animal, and its object is to construct a trap on a principle which shall be applicable in traps proportioned for catching rats, mice, gophers and larger animals, and for catching birds of any kind; such traps being adapted for winding up a spring to store away force enough to operate them a great many times each, so that a great many victims may be caught at one setting; the trap automatically resetting itself after each catch.

To this end my invention consists in the construction and combination of parts for an animal trap herein described.

5 represents the floor of the trap.

6 is a turnstile whose vertical shaft 7, is pivoted in the floor 5, and in a stationary arm 8, of the fixed body 9. A spring 22 is connected at one end with the shaft 7 and wound thereon, and held at its other end to some fixture of the body such as the hook 23 so that when wound up, the turnstile has a continual tendency to revolve in the direction of the arrow 25ª.

The body is divided into two parts, the reception hall 10 and the cage 11. In the partition is a passage guarded by a trap door 12 which is hung at its upper end on hinges 13 while its lower end is free to open when pressed upward by a victim pushing beneath it. This door is a trap for two reasons: first, because the wires of which a portion of its body is made project in the direction the victim enters the cage, so that when he gets his head under the door, which he will try to do and can do easily, he cannot pull back because the pointed wires hold him so he will quickly be lodged in the cage and the door will close behind him.

To the lower edge of the turnstile 6, is secured a ring 14 having a lug or shoulder 15, projecting downward at one and the same distance from each arm of the turnstile, and 16, is the trip latch pivoted to the floor at a point 17 a little outside of the ring, and having an arm 18 crossing beneath the ring and normally actuated by a spring 19 to press upward lightly but closely to the ring so as to intercept each lug 15 when the turnstile is rotated. The arm 18 is provided at its free end with a pan 20 on which the victim may tread and the proportions of this arm and spring may be so adjusted as to permit it to be sprung by the lightest touch, or to require a heavy tread to spring it, according to the game which this trap is set to catch. When the pan is pressed down the arm 18 passes out of the path of the lug 15 which was resting against it and the turn stile is set free to be thrown around to the next lug, carrying into the reception hall 10 the animal that was in the quarter of the turnstile over the pan. Within this quarter and beyond the pan a bait receptacle 25 is located below the plane of revolution of the turnstile. This location of the bait and the trip pan near the center of the turn stile has two objects, first, in order that the victim may be attracted as far as possible into the turnstile before he springs it, and, second, in order that in reaching over the pan for the bait he will press harder on the pan and be sure to spring it at the instant he is well in. The arms of the turnstile are curved to scoop the game in.

Any style of spring or cord and weight arrangement may be adapted to rotate the turnstiles, and the arms of the latter as well as the body of the reception hall and jail may be made of woven wire of any suitable material.

Any style of door 24 may be provided as an outlet to the cage.

One quarter of the turnstile is a portion of the reception hall 10, but the victim thrown therein will make every effort to get as far as possible from what threw him, and will quickly pass the door 12 into the cage 11.

The size and proportion of the various portions of this trap may be changed to adapt it for catching any kind of game desired, and in case of large animals like wolves the trap may be built in the ground by driving stakes to support the various parts without the aid of a floor.

Having thus fully described my invention, what I claim, and desire to secure by Letters Patent, is the following:

1. In an animal trap the combination of a cage and a reception hall having a partition between and a passage in the partition provided with a door hung at the top and slanting into the cage; a turnstile having a vertical shaft journaled to revolve, and having a ring at its lower edge with lugs projecting at intervals corresponding with the arms of the turnstile; a trip latch pivoted outside the circle of the aforesaid ring and having an arm extending into the path of revolution of the said lugs; the said arm being provided with a pan located near the center of the turnstile; a spring for the arm and a bait receptacle nearer the said center than the said pan and below the level of the latter substantially as described.

2. In an animal trap, the combination of a cage; a reception hall separated therefrom by a partition having a passage through it; a trap door for the passage; a turnstile upon a vertical axis located opposite to the reception hall; a pair of arms of the turnstile inclosing a side of the said hall and means for rotating the turnstile, substantially as described.

3. In an animal trap the combination of a vertically journaled turnstile having a ring at its lower side; stop lugs projecting from the ring at intervals; a trip latch pivoted outside the ring and crossing it in the path of the said lugs, the said latch being provided with a trip pan located near the center of the turnstile and provided with a spring; and a cage substantially as described.

4. In animal traps the combination of a cage; a turnstile journaled on end and having lugs projecting below the plane thereof and a trip latch having a pan near the center of the turnstile; a spring and an arm of the latch impelled normally into the path of the said lugs and a bait receptacle located nearer the center of the turnstile than the said pan and below the plane of the latter, substantially as described.

In testimony whereof I affix my signature in presence of two witnesses.

JAMES H. HULINGS.

Witnesses:
H. C. SHAFFER,
E. M. MOSS.